United States Patent Office 2,819,950
Patented Jan. 14, 1958

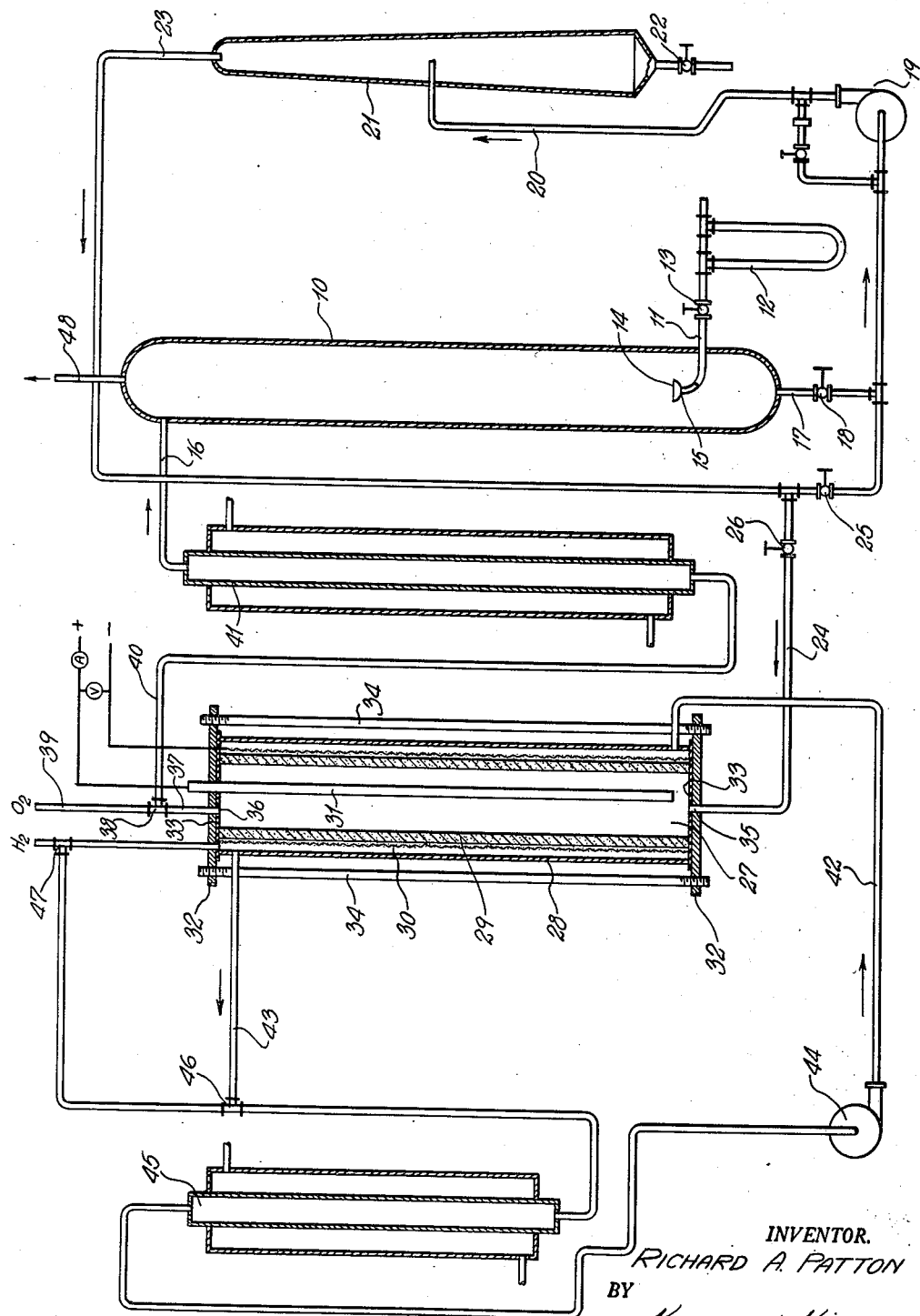

2,819,950

CONVERSION OF HYDROGEN SULFIDE TO SULFUR WITH QUINONES

Richard A. Patton, Pittsburgh, Pa., assignor to Texas Gulf Sulphur Company, New York, N. Y., a corporation of Texas Application March 27, 1952, Serial No. 279,493

12 Claims. (Cl. 23—225)

This invention relates to the conversion of hydrogen sulfide to sulfur by the use of organic oxidizing agents, and more particularly to the oxidation of hydrogen sulfide to sulfur by means of quinones which are thereby converted substantially quantitatively to the corresponding hydroquinones. As a specific embodiment, the invention provides a cyclic continuous process in which hydrogen sulfide is oxidized to sulfur, and the resulting hydroquinone is continuously reoxidized back to the quinone. The preferred embodiment of the invention achieves this reoxidation or regeneration electrically, with liberation of hydrogen, and so achieves the splitting of hydrogen sulfide to sulfur and hydrogen by the use of electrical energy.

Hydrogen sulfide is available in large quantities as a by-product of various industrial operations, including the production and refining of petroleum. The economic aspects of these operations can be improved by the utilization of the hydrogen sulfide. However, uses for the gas as such are limited. Moreover, if discharged into the atmosphere in large quantities it may have a deleterious effect on adjacent structures, due to its corrosive effects, as well as on agriculture. In addition hydrogen sulfide is poisonous and constitutes a health hazard. In consequence, the disposal of waste or by-product hydrogen sulfide is a serious industrial problem, and numerous processes have been suggested and used, especially for converting the gas into sulfur. The processes now known for the conversion depend upon gaseous or inorganic oxidizing agents, and in some cases possess defects based on the difficulty of recovering marketable by-products or economically regenerating the oxidizing agents. The problem of recovery of the sulfur produced, when gaseous or inorganic oxidizing agents are used, is often difficult.

I have found that the overall economics of the conversion of hydrogen sulfide to sulfur can be improved, and the disadvantages of the known processes can be overcome, by the use of novel oxidizing agents taken from the class of organic compounds known as quinones. By properly selecting the quinone to be used from those which are converted substantially quantitatively to the corresponding hydroquinone on treatment with hydrogen sulfide and adjusting the operation conditions as set forth below I can convert hydrogen sulfide substantially quantitatively to sulfur and either simultaneously or in a separate operation regenerate the quinone. Because in my process there is virtually no net loss of the quinone a small amount of the oxidant will suffice for the conversion of large amounts of hydrogen sulfide. Moreover, I can regenerate the hydroquinone formed in the reaction by electrolysis, with liberation of hydrogen, and thereby achieve by my process, including the regeneration step, the splitting of hydrogen sulfide into sulfur and hydrogen by utilizing electrical energy.

The oxidation of hydrogen sulfide may of course be effected by any quinone with an oxidation potential in excess of the reduction potential of hydrogen sulfide. In other words, since the oxidation of hydrogen sulfide to sulfur is expressed by the reaction formula:

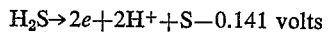

and the reduction of a quinone (Q) to its corresponding hydroquinone ($H_2Q$) by the formula:

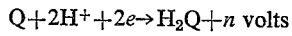

the combined reaction is shown by the addition of the two formulae:

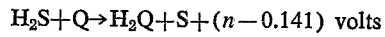

and the reaction would go forward where $(n-0.141)$ is positive. However, since the driving force of the reaction, as measured by the free energy change, is a function of the difference in potential between hydrogen sulfide and the quinone, I have found it preferable to utilize a quinone with as high an oxidation potential as possible.

The applicable thermodynamic relationship is the equation:

$$\Delta F^0{}_{298} = -n(E_{oxid.} - E_{red.})F$$

In this equation, $\Delta F^0{}_{298}$=The change of free energy for the reaction
$n$=The number of equivalents per mole
$E_{oxid.}$=The oxidation potential of the quinone
$E_{red.}$=The reduction potential of hydrogen sulfide
$F$=The number of faradays per equivalent As is usually the case, if $\Delta F^0{}_{298}$ is negative the reaction will proceed as written. However, since $\Delta F^0 = RT \ln K$, for the reaction to proceed essentially to completion, i. e. for the product/reagent ratio to be approximately 100, the $\Delta F^0{}_{298}$ should be at least approximately 1200 calories per mole. This means that the quinone should have an oxidation potential of at least approximately 0.20 volt. As confirmation of this, anthraquinone ($E_{oxid.}=0.15$) was tested and found not to work.

I have found, moreover, that some quinones, which have a satisfactorily high oxidation potential, are nevertheless unsuitable for economic application in my process because the reaction products include materials which interfere with or prevent the desired substantially quantitative regeneration of the quinone. Thus, benzoquinone and diphenoquinone are in part converted to humic acids by the reaction, which entails a loss of reagent. I prefer, therefore, to use quinones of high oxidation potential which, on reaction with hydrogen sulfide, are converted substantially quantitatively to the respective hydroquinones. I have found 1,4-naphthoquinone especially suitable. Other quinones useful in my process include 1,2-naphthaquinone and substituted benzo- and naphthoquinones. Among the substituted 1,4-naphthoquinones I prefer to use such quinones substituted in the 2 position with ortho and para directing groups, such as $-NHCH_3$, $-NH_2-N(CH_3)_2$, OH, $OCH_3$, $CH_3$, $NHCOCH_3$, $C_6H_5$, or $OCOCH_3$. I can use such quinones in which the —H at the three position is substituted by a —$SO_3H$ group. However, as stated above, any quinone with a potential above 0.20 volt and which is converted substantially quantitatively to the corresponding hydroquinone on reaction with hydrogen sulfide may be used.

Since the reaction is essentially an ionic one, I prefer to operate my process with the quinone dissolved or suspended in an aqueous solution, such as dilute alcohol or other hydrophilic solvent. When necessary, the solubility of the quinone may be increased by converting it to the sulfonate. For example, 1,4-naphthoquinone-2-sulfonate is considerably more soluble than the corresponding naphthoquinone, and it is practically as powerful an oxidizing agent, so that the sulfonate lends itself very readily to the operation of my process. In order to affect the coagulation and removal of the sulfur produced in the reaction while avoiding its consumption and side reactions, I operate in an acidic solution or suspension, and this is also desirable in the regeneration step.

During the oxidation of the hydrogen sulfide to free sulfur the quinone is reduced to the corresponding hydroquinone, and the economical application of my process requires that the hydroquinone be reoxidized to the quinone and reused in the hydrogen sulfide step. Various methods of oxidizing hydroquinones are known in the art, and any of them may be used without departing from my invention. However, I prefer to oxidize the quinone electrolytically in a cell which I have designed for the purpose. The accompanying drawing, which is a flow diagram partly in section, shows an apparatus for carrying out my process of oxidizing hydrogen sulfide with continuous concurrent regeneration of the quinone. This diagram is not drawn to scale, and is merely intended to show one manner of carrying out my process. It does, however, show the preferred features of my electrolytic cell for regenerating the quinone. In the drawing the numeral 10 designates the reaction vessel, which may be of glass or other material, depending on the scale of the operations. The hydrogen sulfide is introduced through line 11, the rate of introduction being shown by flow meter 12 and controlled by valve 13, which may be operated manually or mechanically. The hydrogen sulfide inlet line preferably terminates in a flared outlet 14 preceded by a sintered disk 15 or other device for increasing bubble surface. Reaction vessel 10 is preferably elongated in form, and is preferably kept substantially ⅔ full of a circulating solution of the quinone, which may be any of the quinones described above. If desired, vessel 10 may be filled with a packing material so as to obtain better contact between the rising stream of hydrogen sulfide and the descending quinone-containing solution. The quinone-containing stream is introduced through line 16 in the upper part of the reaction chamber and the contents of the vessel or chamber after reaction with hydrogen sulfide, comprising a solution of unreacted quinone, the hydroquinone formed in the reaction, and the sulfur produced by the oxidation of hydrogen sulfide, is removed through line 17 at the bottom of the reaction chamber, the rate of withdrawal being controlled by valve 18. This material is then pumped by pump 19 through line 20 into cyclone separator 21, where the sulfur produced in the reaction is separated from the quinone and the hydroquinone, and is removed from the bottom of the cyclone separator through valved opening 22. The essentially sulfur-free reactants leave the top of the separator through line 23 and may be entirely or in part returned for further treatment to the cyclone separator 21, and in part or entirely passed through line 24 to the electrolytic regeneration cell, the relative amounts of the reactants recirculated and regenerated being controlled by valves 25 and 26.

The regeneration cell, designated by the numeral 27, comprises an outer wall 28, which, like the reaction vessel, may be made of glass or other suitable material within which is positioned a tube 29 made of Alundum or other relatively porous material, thus defining an inner chamber within the cell separated from an outer chamber by a porous partition. Outside, the Alundum tube and adjacent it is a cylindrical cathode 30 preferably constructed of 100 mesh Phosphor bronze wire or similar material. Within the inner portion of the cell is the anode 31, preferably a carbon rod. Brass flange 32 and rubber gaskets 33 cooperate with the tie rods 34 to hold the various parts together, although, of course, any other suitable construction of the cell may be used. The inner vessel is provided with an inlet opening 35, into which the stream passing through line 24 is led and an outlet 36 at the lower and upper portions of the vessel respectively. The spent or partially spent quinone solution is thereby circulated through the inner portion of the regeneration cell, leaving it through line 37 which is provided with a T 38 or other gas-separating device, any oxygen produced in the electrolysis being removed through line 39 while the regenerated solution of the quinone is circulated through line 40 and 16 back to the reaction vessel, preferably passing through cooler 41 on route. The outer annulus of the regeneration cell is provided with an inlet line 42 and an outlet line 43, substantially as shown, which are used for circulating a catholyte through the outer or cathode chamber of the cell. For this purpose pump 44 is provided, and a cooler 45 may be used for removing heat from the circulating catholyte. As the electrolyte in the cathode chamber I prefer to use an aqueous solution of about 20% sulfuric acid or sodium sulfate, although any electrolyte having the property of anionic stability may be used. The anode and cathode are respectively connected with the positive and negative poles of a source of direct current at a potential difference of approximately 2 volts and capable of supplying an input of approximately 20 amperes per square meter of anode area. T's or other gas separating devices 46 and 47 are provided in the catholyte circuit for separating the hydrogen evolved in the process.

In operating my process in the apparatus described, I prepare a solution of approximately 1% by weight of a selected quinone having the properties set forth above in water, aqueous alcohol, or other hydrophilic solvent. The exact strength of the solution does not play a critical part in my process, and I prefer to use as concentrated a solution as possible, which will depend upon the specific quinone and solvent used. I use a small amount of sulfuric or other acid as a coagulant for the sulfur produced in the reaction. A sufficient quantity of solution is charged into the apparatus to substantially fill the anode chamber of the regeneration cell and the cyclone separator and to fill the reaction chamber about ⅔ full, and circulation of the solution is started by means of pump 19. At the same time, a circulating stream of catholyte is provided by means of pump 44 through the cathode chamber of the regenerating cell and cooler 45. Hydrogen sulfide, or hydrogen sulfide-containing gases are introduced through line 13. The rate of addition of hydrogen sulfide is preferably such that approximately 2 cc. per minute per liter of solution in the reaction vessel is introduced, although I may operate in the range of less than 1 to 250 cc. per liter per minute. The rate of flow of the quinone solution through the reaction vessel is such that the time of contact between the hydrogen sulfide and the quinone solution is approximately 30 to 45 minutes, as I have found that this time of contact gives the best results. However, other rates may be used. If the quinone solution is circulated too rapidly a higher concentration of unreacted quinone will be discharged at the bottom of the reactor, and if the solution is circulated too slowly unreacted hydrogen sulfide will pass out of the reactor through opening 48. Effluent from the reaction vessel is pumped into the cyclone or other separator diagrammatically shown at 21, where the precipitated sulfur formed in the reaction is separated from the solution. The sulfur may be withdrawn continuously or intermittently through valve 22. Depending on the type of separator used, more or less of the solution may accompany the sulfur, in which case the sulfur is separated from the solution by filtration and the solution is returned to the system. The hydroquinone-rich solution passing through valve 26 is charged into the bottom of the anode cell of the regenerator and passes upwardly through the regenerator, leaving it through opening 36. Conditions in the regenerating cell are so adjusted that the hydroquinone in the solution is substantially converted to the corresponding quinone during the passage of the solution through the cell. I have found that a difference of potential of approximately 2 to 5 volts and a current density of approximately 20 amperes per square meter gives satisfactory results, although voltages between less than 1 and 110 and current densities in the range less than 1 to 30 can be used. The rate of passage of the hydroquinone-rich solution into the regeneration cell is preferably such that it remains in the cell for approximately 0.15 minute, the exact time in any specific case being a function of cell design—i. e. anode area, current density, and anode compartment volume. It is desirable to operate the regenerating cell just below its overvoltage, by which term is meant the potential at which oxygen is evolved at the anode. In order to obtain maximum conversion of hydroquinone to quinone I prefer to design my cell so as to provide the maximum overvoltage. For this reason I prefer to use a divided cell as shown in the drawing, but this is not essential, and I have also obtained satisfactory results with a single chambered cell. Moreover, I have found that the anode bubble overvoltage diminishes as the hydroquinone is oxidized to the quinone form. I, therefore, can obtain greater capacity in a given cell at a high ratio of hydroquinone to quinone concentration.

Where the rate of introduction of hydrogen sulfide and the time of contact are such that the quinone is substantially exhausted and converted by the reaction to the corresponding hydroquinone and the regeneration cell is balanced so that it can oxidize the hydroquinone formed back to the quinone, valves 25 and 26 are so adjusted that the solution leaving settler 21 passes into the regenerator. However, under some conditions it may be desired to recirculate all or part of the solution leaving the separator, in which case the adjustment of valves 25 and 26 is so controlled as to give the desired distribution of the solution.

I prefer to maintain temperatures of approximately 15 to 50° C. in both the reaction and regeneration stages of my process, although somewhat lower or higher temperatures may be used without too great a loss of efficiency. Since heat is generated during the regeneration process, I prefer to use coolers 41 and 45 for the regenerated solution and the catholyte respectively.

By operating in the manner described above I can oxidize hydrogen sulfide to sulfur substantially quantitatively in a continuous manner and continuously regenerate the quinone used as my oxidizing agent. I can also carry out my process in a single vessel in which the oxidation of hydrogen sulfide to sulfur by means of a quinone and the electrolytic regeneration of the resulting hydroquinone are carried on simultaneously. Thus, I have found by passing hydrogen sulfide or a hydrogen sulfide-containing gas through a water solution or dispersion of a quinone buffered to a pH of between 4 and 5, and preferably between 4.2 and 4.6, while a direct current of from about 0.5 to about 5 amperes was passed through the solution between electrodes spaced ¼ to ½ inch apart, that the hydrogen sulfide was converted to sulfur while the hydroquinone produced was simultaneously regenerated to the quinone. However, I obtained more satisfactory results by conducting the oxidation and the regeneration in separate vessels.

My invention is not limited to the use of electrolytic regeneration, and other methods of converting the hydroquinone back to the quinone may be used. Moreover, I have found that the oxidation of hydrogen sulfide can be carried out with equal effectiveness when the quinone is not entirely dissolved but is present as a suspension in a saturated solution of the quinone. Under these conditions the suspended quinone is reacted as well as the dissolved quinone, and the rate of the reaction may be increased by taking advantage of the higher concentrations of the quinone thus made available. I can also use the quinone in undissolved form, either mixed with or supported on a carrier such as asbestos, or by using a fluidized solids technique in which the quinone undergoing reaction is maintained as a fluidized bed by the hydrogen sulfide, to which other relatively inert gases may be added. When using a quinone in solid form I find it necessary to introduce small amounts of moisture. This may be conveniently done by introducing small amounts of steam to the reactor, either with the hydrogen sulfide or separately.

In the above description and the following claims I have used the term "quinone" generically to designate the substances already described as being suitable for my reaction. These include all quinones and substituted quinones having an oxidation potential of 0.20 volt or more, including the corresponding sulfonates and other more soluble derivatives. By the term "converted substantially quantitatively to the corresponding hydroquinone" I do not mean that all of the quinone entering the reaction zone is converted during a single pass, but rather that whatever proportion of the quinone is changed during the reaction will be changed substantially quantitatively to the corresponding hydroquinone.

It will of course be understood by those versed in the art that the nature of electrolytic processes is such that operating conditions are dependent on cell design, and that changes in the latter, including the use of multiplate cells, will result in changes in the operating conditions described without, however, departing from my invention.

This application is a continuation-in-part of application Serial No. 132,381 filed December 10, 1949, now abandoned.

What is claimed is:

1. A process of decomposing hydrogen sulfide comprising circulating a fluid acid medium in a cyclic path, conveying a quinone having an oxidation potential of at least 0.2 volt in said medium to a first reaction zone in said path, introducing hydrogen sulfide into said zone and reacting it with said quinone, thereby converting said hydrogen sulfide substantially quantitatively into free sulfur and reducing at least part of said quinone substantially quantitatively to the corresponding hydroquinone, and removing sulfur from the reaction products, conveying said hydroquinone in said medium together with unreacted quinone to a second reaction zone in said path and oxidizing the hydroquinone back to the quinone in said second reaction zone.

2. A process of decomposing hydrogen sulfide comprising circulating a fluid acid medium in a cyclic path, conveying a quinone having an oxidation potential of at least 0.2 volt and convertible quantitatively by reaction with hydrogen sulfide to the corresponding hydroquinone in said medium to a first reaction zone in said path, introducing hydrogen sulfide into said zone and reacting it with said quinone, thereby converting said hydrogen sulfide substantially quantitatively into free sulfur and reducing at least part of said quinone substantially quantitatively to the corresponding hydroquinone, and removing sulfur from the reaction products, conveying said hydroquinone in said medium together with unreacted quinone to a second reaction zone in said path and oxidizing the hydroquinone back to the quinone in said second reaction zone.

3. A process of decomposing hydrogen sulfide comprising circulating an aqueous fluid acid medium in a cyclic path, conveying a quinone having an oxidation potential of at least 0.2 volt and convertible quantitatively by reaction with hydrogen sulfide to the corresponding hydroquinone in said medium to a first reaction zone in said path, introducing hydrogen sulfide into said zone and reacting it with said quinone, thereby converting said hydrogen sulfide substantially quantitatively into free sulfur and reducing at least part of said quinone substantially quantitatively to the corresponding hydroquinone, and removing sulfur from the reaction products, conveying said hydroquinone in said medium together with unreacted quinone to a second reaction zone in said path and oxidizing the hydroquinone back to the quinone in said second reaction zone.

4. A process of decomposing hydrogen sulfide comprising circulating a fluid acid medium in a cyclic path, conveying a quinone having an oxidation potential of at least 0.2 volt and convertible quantitatively by reaction with hydrogen sulfide to the corresponding hydroquinone in said medium to a first reaction zone in said path, introducing hydrogen sulfide into said zone and reacting it with said quinone, thereby converting said hydrogen sulfide substantially quantitatively into free sulfur and reducing at least part of said quinone substantially quantitatively to the corresponding hydroquinone, and removing sulfur from the reaction products, conveying said hydroquinone in said medium together with unreacted quinone to a second reaction zone in said path and oxidizing electrolytically the hydroquinone back to the quinone in said second reaction zone.

5. A process of converting hydrogen sulfide into hydrogen and sulfur comprising reacting hydrogen sulfide with a quinone having an oxidation potential of at least 0.2 volt, continuously regenerating the quinone by electrolytic oxidation of the hydroquinone formed in the reaction, and reacting further quantities of hydrogen sulfide with the said regenerated quinone and removing sulfur from the reaction products.

6. A process of converting hydrogen sulfide into hydrogen and sulfur comprising reacting hydrogen sulfide with a quinone having an oxidation potential of at least 0.2 volt, continuously regenerating the quinone by electrolytic oxidation of the hydroquinone formed in the reaction, and reacting further quantities of hydrogen sulfide with the said regenerated quinone and removing sulfur from the reaction products.

7. A process of converting hydrogen sulfide into hydrogen and sulfur comprising reacting hydrogen sulfide with a quinone having an oxidation potential of at least 0.2 volt and convertible quantitatively by reaction with hydrogen sulfide to the corresponding hydroquinone, continuously regenerating the quinone by electrolytic oxidation of the hydroquinone formed in the reaction, and reacting further quantities of hydrogen sulfide with the said regenerated quinone and removing sulfur from the reaction products.

8. The method of converting hydrogen sulfide to sulfur comprising creating a closed circuit flow of a stream of acid medium containing a quinone having an oxidation potential of at least 0.2 volt and convertible quantitatively by reaction with hydrogen sulfide to the corresponding hydroquinone, introducing a flow of hydrogen sulfide counter-current to said stream at one station on said stream and at another station on said stream subjecting said stream to electrolytic oxidation to convert hydroquinone therein to the corresponding quinone and removing sulfur from the reaction products.

9. The method of producing sulfur from hydrogen sulfide comprising creating a closed circuit flow comprising a stream of an acid medium containing a quinone having an oxidation potential of at least 0.2 volt and convertible quantitatively by reaction with hydrogen sulfide to the corresponding hydroquinone, producing sulfur by introducing hydrogen sulfide counter-current to the flow of said stream at one station, separating the sulfur, and at another station spaced from said first station converting the hydroquinone to quinone by electrolytic oxidation.

10. The method according to claim 8 in which the quinone is of the formula

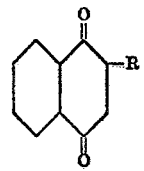

R being selected from the group consisting of hydrogen, sulfonate groups, and ortho-para directing radicals.

11. The method according to claim 8 in which the quinone is of the formula

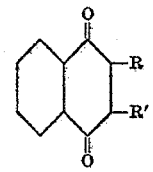

R being selected from the group consisting of —$NHCH_3$, —$NH_2$, —$N(CH_3)_2$, OH, $OCH_3$, $CH_3$, $NHCOCH_3$, $C_6H_5$, and $OCOCH_3$ and R' being selected from the group consisting of —H and —$SO_3H$.

12. The method of converting hydrogen sulfide to sulfur comprising creating a closed circuit flow of a stream of acid medium containing a quinone having an oxidation potential of at least 0.2 volt and convertible quantitatively by reaction with hydrogen sulfide to the corresponding hydroquinone, introducing a flow of hydrogen sulfide counter-current to said stream at one station on said stream and at another station on said stream subjecting said stream to electrolytic oxidation to convert hydroquinone therein to the corresponding quinone and removing sulfur from the reaction products, said quinone having the formula

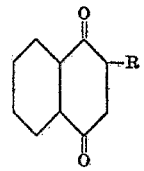

wherein R is selected from the group consisting of —H, —$SO_3H$, —$NHCH_3$, —$NH_2$, —$N(CH_3)_2$, OH, $OCH_3$, $CH_3$, $NHCOCH_3$, $C_6H_5$, and $OCOCH_3$.

References Cited in the file of this patent

UNITED STATES PATENTS

| | | |
|---|---|---|
| 1,855,353 | Jacobson | Apr. 26, 1932 |
| 2,015,038 | Pevere | Sept. 17, 1935 |
| 2,135,368 | Vagenius et al. | Nov. 1, 1938 |
| 2,158,525 | Riedl et al. | May 16, 1939 |
| 2,488,000 | Bernard | Nov. 15, 1949 |

FOREIGN PATENTS

| | | |
|---|---|---|
| 521,648 | Germany | Dec. 20, 1928 |
| 168,504 | Great Britain | Sept. 8, 1921 |
| 126,544 | Hungary | Mar. 17, 1941 |

OTHER REFERENCES

Degering: "An Outline of Organic Chemistry," 4th ed., page 202, Barnes and Noble, N. Y. C., 1941.

Conant: "The Chemistry of Organic Compounds," revised ed., pages 387–388. Macmillan Co., N. Y. C., 1939.

Latimer and Hildebrand: "Reference Book of Inorganic Chemistry," revised ed., page 475, Macmillan Co., N. Y. C., 1940.

Rowe: "Color Index," 1st edition, 1924, page 280.